Jan. 15, 1974  L. G. HALLAMORE  3,785,913
PREFABRICATED CONSTRUCTION PANEL

Filed Aug. 12, 1971  2 Sheets-Sheet 2 ated Jan. 15, 1974

3,785,913
PREFABRICATED CONSTRUCTION PANEL

Lloyd G. Hallamore, Long Beach, Calif., assignor to Hallamore Homes, Inc., Fountain Valley, Calif.
Filed Aug. 12, 1971, Ser. No. 171,064
Int. Cl. B32b *1/06, 3/06;* E04c *2/24*
U.S. Cl. 161—41     13 Claims

ABSTRACT OF THE DISCLOSURE

A structural panel particularly suitable for use as an exterior member of a building is disclosed. The panel includes an inner skin for providing a suitable internal wall finish and a weather resistant outer skin. A layer of rigid plastic foam is disposed adjacent the inner skin and a layer of compressible heat resistant and acoustically insulating material is disposed between the foam and the outer skin to accommodate the thermal expansion and contraction of the foam. Strengthening struts may be suitably positioned between the inner and outer skins of the panel to accommodate stresses as required by applicable building codes.

BACKGROUND OF THE INVENTION

(1) Field of the invention

This invention relates to structural panels that may be employed in prefabricated modular buildings and, more particularly, to panels for use as the exterior walls of such buildings.

(2) Description of the prior art

Prefabricated panels for use in buildings such as modular homes have received widespread acceptance in the building industry as one measure to offset the increasing cost of labor. Such panels have been manufactured from a wide variety of materials such as compressed fibrous or particulate materials (i.e. paperboard), metal, gypsum board and rigid plastic foam which is sandwiched between suitable facing sheets.

Plastic, and particularly urethane, foam panels have received considerable attention because of the low manufacturing cost, weather resistance and high strength characteristics of such panels. Generally such prior art panels are of a sandwich type construction in which the plastic foam is bonded between an outer weather resistant skin, i.e., wood or metal, and an inner skin which provides a suitable internal wall finish. Strengthening studs or struts made of wood or metal may be spaced within the panel to meet applicable building codes.

Prior art plastic foam panels while strong and inexpensive have exhibited several important disadvantages which have limited the use of such panels. The plastic foam has a tendency to expand and contract with changes in temperature after it is cured. Such expansion and contraction frequently causes the panel to bow and fail as a structural member. This problem is aggravated by moisture which may become trapped inside of the panel. Furthermore, the exterior surface of such panels is difficult to repair when damaged due to the fact that the foam is bonded to the outer skin. Therefore, a panel which has only a small damaged area such as a puncture in the outer skin must generally be replaced in its entirety.

Plastic panels of the prior art exhibit poor sound attenuation, particularly at low frequencies, and, for this reason, exterior walls made of plastic foam have been unsatisfactory at locations where the ambient noise level is high, for example near airports. Finally, the manufacture of the prior art foam panels requires the use of large jigs or fixtures to confine the foam during the curing process and prevent distortion of the panels.

The building panel of this invention overcomes the disadvantage of the prior art plastic foam panels while retaining the beneficial qualities of such foam. A panel made in accordance with the invention is strong, lightweight, inexpensive, moisture and heat resistant and sound insulating. Furthermore, the exterior surface of the panel may be readily repaired without disturbing the inner skin.

SUMMARY OF THE INVENTION

A building panel made in accordance with the present invention is fabricated with an inner skin suitable for forming an internal wall surface and an outer weather resistant skin. A layer of rigid plastic foam such as urethane is disposed adjacent to the inner skin and, preferably, is rigidly bonded thereto to provide a rigid inner wall. A layer of heat resistant acoustically insulating compressible material such as fiberglass is disposed between the foam and the outer skin to accommodate the thermal expension and contraction of the foam.

The objects and advantages of the invention will be more readily appreciated in connection with the following description which is to be considered in connection with the accompanying drawings.

DESCRIPTION OF THE PREFERRED EMBODIMENT

Figure 1:
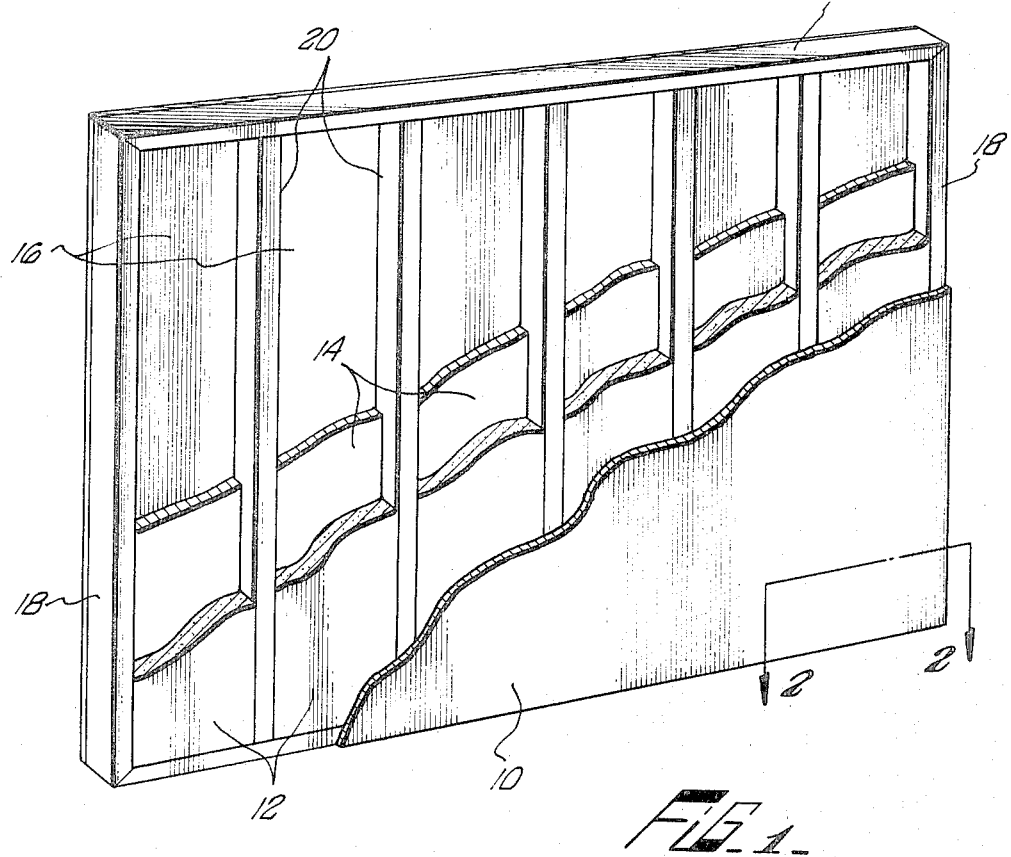
FIG. 1 is a partially fragmented perspective view of a construction panel in accordance with the present invention.
Figure 2:
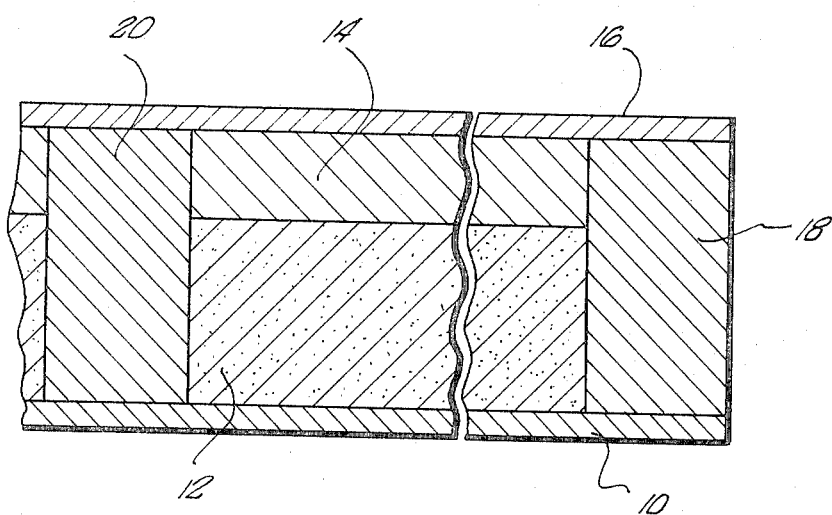
FIG. 2 is a cross sectional view taken along line 2—2 of FIG. 1.

Referring to the FIGS. 1 and 2, a structural panel in accordance with the present invention includes an inner skin 10 or any suitable interior finishing material such as plywood, plasterboard, etc. A layer of rigid plastic (e.g. urethane or polystyrene) foam 12 is disposed adjacent the inner skin 10 and preferably bonded thereto to provide a rigid inner wall surface. The foam preferably has a low density of 2 to 6 pounds per cubic foot. However, foams of other densities may be used to meet a particular structural requirement. A layer 14 of compressible, heat resistant and acoustically insulating material such as fiber glass, rock wool, cementitious expanded fiber, perlite or vermiculite is disposed between the foam 12 and an outer skin 16. The outer skin 16 may be formed of exterior plywood, metal or any other suitable material for exterior use.

A peripheral band 18 made of suitable material such as wood or metal surrounds the edge of the panel to provide a unitary structure. A plurality of studs or struts 20 may be vertically positioned along the panel as illustrated to provide structural strength, if necessary, to meet applicable building codes. Each strut or stud may be of any suitable material, for example, wood.

The panel is preferably manufactured by attaching the inner skin 10 to the peripheral band 18 and the studs 20 by nails, glue or other suitable fastening means. The panel shell formed by the inner skin, peripheral band, and studs is then positioned horizontally, vertically or at an angle and the plastic foaming material, such as urethane, in liquid form is sprayed or poured on top of the inner skin 10 to provide a suitable layer of foam which may, for example, occupy two-thirds of the space between the inner skin to form a rigid inner wall surface for the completed panel. A layer 14 of compressible material such as fiberglass is then laid on top of the foam 12, preferably before the foam is cured so that the exposed surface of the foam will form a bond with the fiber glass. The outer skin 16 is then attached to the peripheral band 18 and struts 20 by nails, etc., to complete the manufacturing process. Since the fiber glass allows the foam to expand, no jigs or fixtures are necessary to hold the inner and outer skins in place during the curing process. The time required for the foam to expand or rise is very short, e.g. 45-60 seconds. The panels may be of any desired size to form all or part of an exterior wall for a modular building.

The fiber glass 14 allows the foam layer 12 to expand or contract as a result of temperature changes, etc., without causing the panel to bow or structurally fail during use.

The outer skin 16 may be readily replaced if damaged without disturbing the foam layer and inner skin. Furthermore, the fiber glass layer attenuates acoustical energy and thus acts as a sound insulator. This enables the panel to be used in environments of high ambient noise, e.g., in the vicinity of airports. The bond between the inner surfaces of the foam and fiber glass apparently aid in sound attenuation, though it is not necessary that the two layers be bonded together.

Figure 3:
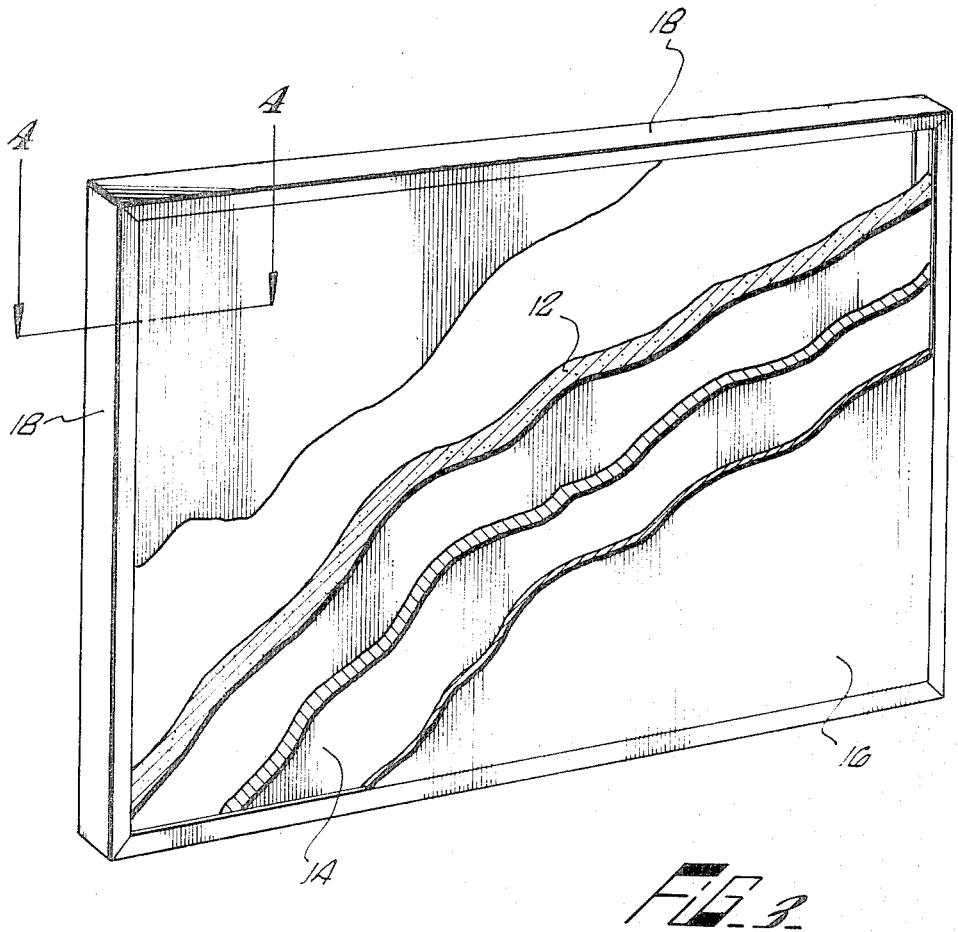
FIG. 3 is a partially fragmented perspective view of a structural panel in accordance with another embodiment of the invention.
Figure 4:
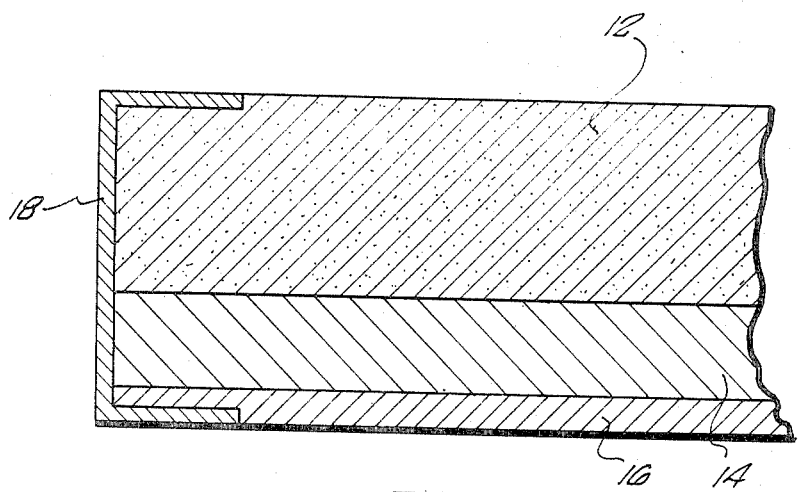
FIG. 4 is a cross sectional view taken along lines 4—4 of FIG. 3.

Referring now to FIGS. 3 and 4, a panel is illustrated in which the urethane foam layer 12 forms the inner skin or interior wall surface. The outer skin 16 is made of a suitable material such as aluminum and secured in place by the peripheral band 18 which is also preferably made of metal in this embodiment. No interior studs or strut members are illustrated in embodiment of FIGS. 3 and 4 though such members may be added for strength if necessary.

The present invention provides a prefabricated modular building panel of planar shape that is particularly adapted to be used as an exterior wall. Various modifications of the panels described above would be obvious to those skilled in the art and are within the scope and spirit of my invention.

What is claimed is:
1. A prefabricated modular building panel comprising:
   (a) an inner skin,
   (b) a weather resistant outer skin,
   (c) a layer of rigid plastic foam adjacent the inner skin, and
   (d) a layer of heat resistant and acoustically insulating compressible material disposed between the foam and the outer skin to accommodate the thermal expansion and contraction of the foam.
2. The combination as defined in claim 1 including a peripheral band enclosing the edge of the layers of foam and compressible material to form a unitary structure.
3. The combination as defined in claim 2 wherein the foam is urethane foam.
4. The combination as defined in claim 2 wherein the foam is polystyrene foam.
5. The combination as defined in claim 2 wherein the compressible material is fiber glass.
6. The combination as defined in claim 2 wherein the compressible material is cementitious expanded fiber.
7. The combination as defined in claim 2 wherein the compressible material is rock wool.
8. The combination as defined in claim 2 wherein the compressible material is perlite.
9. The combination as defined in claim 2 wherein the compressible material is vermiculite.
10. The combination as defined in claim 2 including a plurality of vertically oriented struts disposed between the inner and outer skins.
11. The combination defined by claim 1 further including:
   a peripheral band enclosing the edges of the layers of foam and compressible material to form a unitary structure; and
   a plurality of vertically oriented struts disposed between the inner and outer skins wherein said foam is bonded to said inner skin and to the surface of said compressible material adjacent to said foam.
12. The combination as defined in claim 1 wherein the foam is bonded to the inner skin.
13. The combination as defined in claim 1 wherein the foam is bonded to the adjacent surface of the compressible material.

References Cited
UNITED STATES PATENTS

| | | | |
|---|---|---|---|
| 2,880,471 | 4/1959 | Munchhausen | 52—404 |
| 3,412,513 | 11/1968 | Gosele | 52—612 |
| 3,573,144 | 3/1971 | Andersen | 161—69 |
| 3,729,880 | 5/1973 | Eliason | 161—161 |

WILLIAM J. VAN BALEN, Primary Examiner

U.S. Cl. X.R.

52—309, 404; 156—71, 78; 161—69, 160, 161